J. v. RIJN v. ALKEMADE.
PRODUCTION OF TRANSLUCENT, UNIFORMLY COLORED PARAFFIN.
APPLICATION FILED JAN. 27, 1913.
1,076,000.
Patented Oct. 14, 1913.
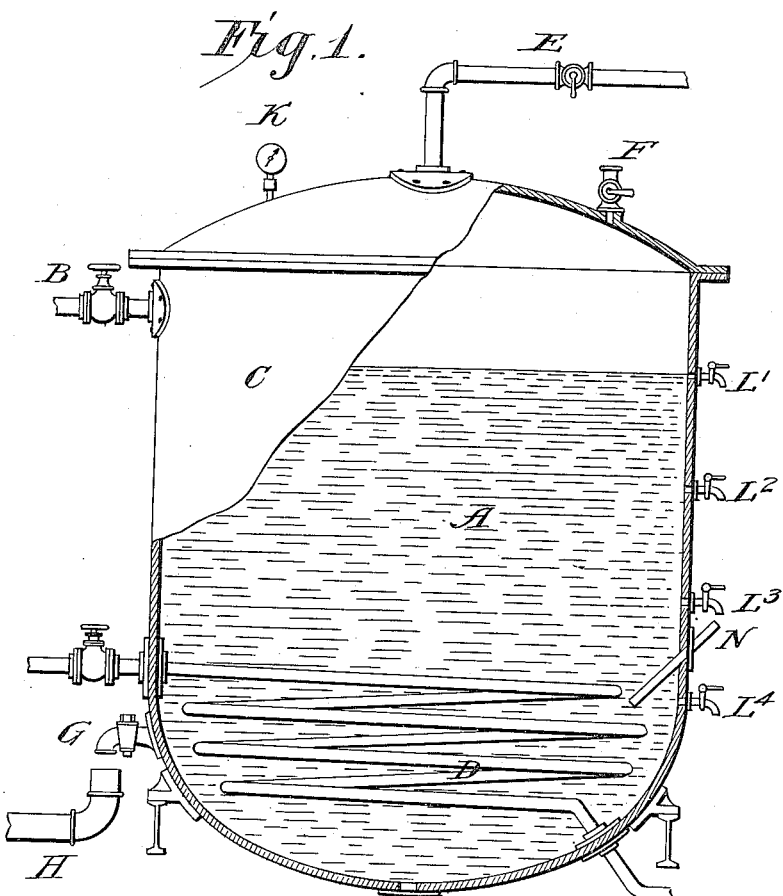
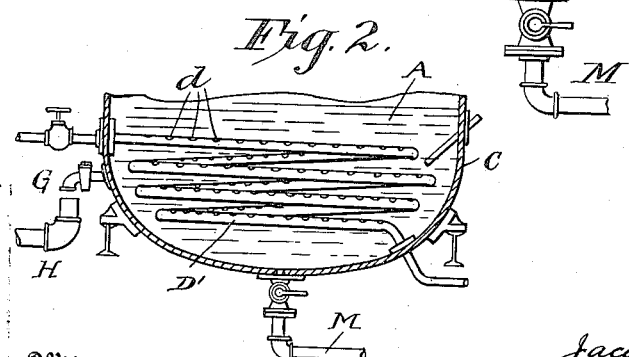

UNITED STATES PATENT OFFICE.

JACOB v. RIJN v. ALKEMADE, OF BALIK PAPAN, BORNEO, DUTCH EAST INDIA.

PRODUCTION OF TRANSLUCENT, UNIFORMLY-COLORED PARAFFIN.

1,076,000. Specification of Letters Patent. Patented Oct. 14, 1913.

Application filed January 27, 1913. Serial No. 744,544.

*To all whom it may concern:*

Be it known that I, JACOB VON RIJN VON ALKEMADE, residing at Balik Papan, Borneo, Dutch East India, have invented certain new and useful Improvements in the Production of Translucent, Uniformly-Colored Paraffin; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

Some of the great drawbacks hitherto encountered in the manufacture of solid paraffin are that it becomes more or less opaque and its various parts are of an uneven color and consequently have an undesirable appearance after it has been converted from a clear liquid condition into a solid one. Large quantities of paraffin are thus unutilized in consequence of the low price obtainable therefor. Now it has been found that the opacity of paraffin is caused by its absorbing air when in a molten condition.

According to this observation, the invention has for its object a process for melting opaque paraffin, rendering it free from air and avoiding absorption of air in cooling.

The process may be carried out in various ways and an apparatus serving for performing this process is shown in the accompanying drawing.

Figure 1 is a vertical section, with parts shown in elevation; Fig. 2 is a modification of Fig. 1.

The molten paraffin A is passed through a feed pipe B into a closed vessel C and heated therein by means of a steam pipe D to a much higher temperature than its melting point. A vacuum is simultaneously produced in the vessel, the air above the paraffin being drawn off by means of an air pump, through a pipe E. The air diffused in the paraffin is thereby almost entirely expelled. After a certain time the heating steam is shut off and the paraffin is then allowed to cool to a temperature very slightly above its melting point. It thereby loses its property of absorbing air in quantities which would afterward render it opaque. Air is then admitted through the air inlet cock F and the paraffin run off through the cock G and the pipe H and cast into blocks or into candles or the like.

The heating vessel is provided with the necessary fittings such as a vacuum gage K, small testing cocks $L^1$, $L^2$, $L^3$, $L^4$, a sludge cock M and a thermometer N.

Another method which fulfils the same object consists in passing free steam through the molten paraffin through the perforations $d$ in steam pipe $D'$, Fig. 2. The air is also by this means removed from the paraffin. When it can be assumed that the latter is free of air, the steam is shut off and the vessel simultaneously closed. After cooling and destroying the vacuum thereby produced, the paraffin may be poured out and cast into the desired shape.

Having now particularly described and ascertained the nature of my said invention and in what manner the same is to be performed, I declare that what I claim is:

1. A process for rendering paraffin uniformly translucent, which comprises removing the air from the paraffin while molten, and maintaining the air excluded from the paraffin until cooled down to molding or casting condition.

2. A process for rendering paraffin uniformly translucent, which comprises establishing a vacuum over the paraffin while in a molten condition and maintaining said vacuum until the paraffin has cooled to molding or casting condition.

3. A process of rendering paraffin uniformly translucent, which comprises melting the paraffin by passing steam through it in a suitable container, and establishing a vacuum over the paraffin by the condensation of the steam in said container while cooling the paraffin to molding or casting condition.

In testimony that I claim the foregoing as my invention, I have signed my name in presence of two subscribing witnesses.

J. v. RIJN v. ALKEMADE.

Witnesses:
KERR DIA ANANDYERHEUL,
Dr. COMPEEDITSICH.